(12) United States Patent
Rijfers et al.

(10) Patent No.: US 9,573,104 B2
(45) Date of Patent: Feb. 21, 2017

(54) METHOD OF SPRAY-DRYING AND APPARATUS FOR SPRAY-DRYING

(75) Inventors: Andries Rijfers, Delft (NL); Leonardus Antonius Maria Brouwers, Delft (NL); René Jos Houben, Delft (NL); Robin Bernardus Johannes Koldeweij, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 366 days.

(21) Appl. No.: 14/239,154

(22) PCT Filed: Aug. 15, 2012

(86) PCT No.: PCT/NL2012/050568
§ 371 (c)(1),
(2), (4) Date: Aug. 7, 2014

(87) PCT Pub. No.: WO2013/025102
PCT Pub. Date: Feb. 21, 2013

(65) Prior Publication Data
US 2014/0346698 A1  Nov. 27, 2014

(30) Foreign Application Priority Data
Aug. 16, 2011 (EP) .................... 11177656

(51) Int. Cl.
*B01J 2/04* (2006.01)
*B01J 2/18* (2006.01)
(Continued)

(52) U.S. Cl.
CPC .. *B01J 2/04* (2013.01); *B01J 2/18* (2013.01); *B05B 1/04* (2013.01)

(58) Field of Classification Search
None
See application file for complete search history.

(56) References Cited

U.S. PATENT DOCUMENTS

| | | |
|---|---|---|
| 2011/0052786 A1 | 3/2011 | Poortinga et al. |
| 2011/0084000 A1 | 4/2011 | Duyvesteyn et al. |
| 2011/0305987 A1* | 12/2011 | Yohichiroh .......... G03G 9/0806 430/109.3 |

FOREIGN PATENT DOCUMENTS

| | | |
|---|---|---|
| CN | 101652170 A | 2/2010 |
| EP | 0235603 A2 | 9/1987 |

(Continued)

OTHER PUBLICATIONS

International Search Report—PCT/NL2012/050568—Mailing date: Nov. 7, 2012.

*Primary Examiner* — Mary F Theisen
(74) *Attorney, Agent, or Firm* — Banner & Witcoff, Ltd.

(57) ABSTRACT

Method of spray-drying a high-viscosity fluid, e.g. comprising a food product. The method comprises providing a nozzle plate wherein at least one nozzle is provided, said nozzle plate having an inner main surface and an outer main surface. The method comprises providing the high-viscosity fluid in a reservoir that is in fluidum connection with the at least one nozzle. The method comprises pressurizing the high-viscosity fluid in the reservoir, wherein the fluid flows, as a result of said pressurizing, towards the nozzle plate, thus creating a pressure difference over the at least one nozzle so that the fluid flows out of the at least one nozzle, thereby passing the outer main surface after passing the inner main surface. A cross-sectional area of the at least one nozzle in the inner main surface exceeds a cross-sectional area of the at least one nozzle in the outer main surface.

20 Claims, 6 Drawing Sheets

(51) Int. Cl.
*B01D 1/18* (2006.01)
*B05B 1/04* (2006.01)

(56) References Cited

FOREIGN PATENT DOCUMENTS

| WO | 2008069639 A1 | 6/2008 |
| WO | 2010085143 A2 | 7/2010 |
| WO | 2011026896 A1 | 3/2011 |

* cited by examiner

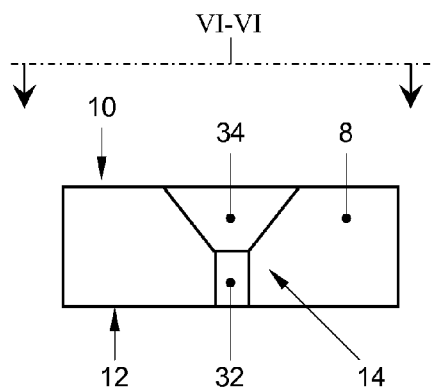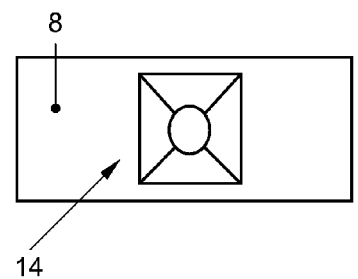
Fig. 6A Fig. 6B
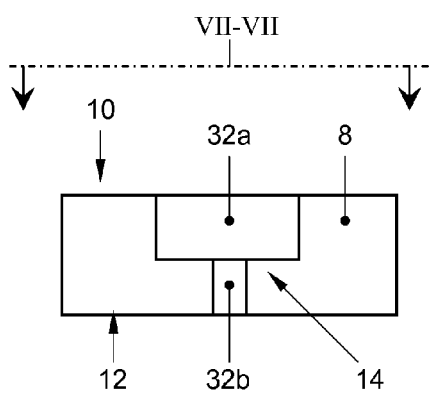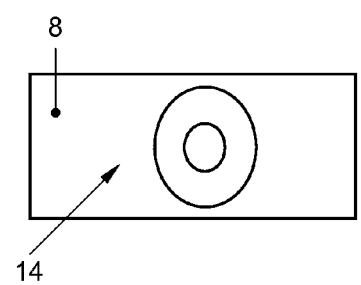
Fig. 7A Fig. 7B

METHOD OF SPRAY-DRYING AND APPARATUS FOR SPRAY-DRYING

CROSS-REFERENCE TO RELATED APPLICATIONS

This application is a U.S. National Stage application under 35 U.S.C. §371 of International Application PCT/NL2012/050568 (published as WO 2013/025102 A1), filed Aug. 15, 2012, which claims priority to Application EP 11177656.3, filed Aug. 16, 2011. Benefit of the filing date of each of these prior applications is hereby claimed. Each of these prior applications is hereby incorporated by reference in its entirety.

The invention relates to a method of spray-drying a high-viscosity fluid. The invention also relates to an apparatus for spray-drying of a high-viscosity fluid. The invention also relates to a product.

Spray drying of a high-viscosity fluid product through at least one nozzle can be used for producing a product such as a food product in the form of a powder. The fluid to be spray dried may comprise a dispersion and/or solution of the product in a solvent, e.g. a liquid such as water. The fluid is fed from a fluid reservoir through the nozzle. After the fluid flows out of the nozzle, it may break up into droplets e.g. according to a Rayleigh breakup principle. The out-flowing or ejected droplets may be dried using a drying medium such as air. While the liquid is removed, particles forming the powder may remain after drying of the droplets. The powdered product may e.g. comprise a powdered food product containing food or beverage ingredients with proteins, carbon hydrates, fats, or combinations thereof, more specifically e.g. dairy products, liquid flavor compounds, etc.

Generally a wish for a high production rate of the product may exist. Thereto a relatively high pressure difference over the nozzles may be beneficial. However, such a high pressure difference may impose requirements to an apparatus used for spray drying. For example, a nozzle plate containing the nozzles should be strong enough to withstand the pressure difference. Thereto the nozzle plate may be made relatively thick. However, using a thicker nozzle plate in order to withstand a certain pressure difference over the nozzle plate can be expected to diminish the flow rate through the nozzles, because a thicker nozzle plate generally causes a longer nozzle. Such diminishing of the flow rate however is contrary to the initial reason of increasing the pressure difference over the nozzle. So, at least part, possibly a significant part, of the effect of increasing the pressure may be lost.

Therefore, there exists a need for an improved method and apparatus for spray drying a high-viscosity fluid, which at least partly meets the problem mentioned above.

Accordingly, according to an aspect of the invention, there is provided a method of spray-drying a high-viscosity fluid that e.g. comprises a food product, the method comprising: —providing a nozzle plate wherein at least one nozzle is provided, said nozzle plate having an inner main surface and an outer main surface, the least one nozzle extending through the nozzle plate from the inner main surface to the outer main surface; —providing the high-viscosity fluid in a reservoir that is in fluidum connection with at least one nozzle; —pressurizing the high-viscosity fluid in the reservoir, wherein the fluid flows, as a result of said pressurizing, towards the nozzle plate, thus creating a pressure difference over the at least one nozzle so that the fluid flows out of the at least one nozzle, thereby passing the outer main surface after passing the inner main surface; and at least partially drying the droplets in a drying medium, such as air, to become particles; wherein a cross-sectional area of the at least one nozzle in the inner main surface exceeds a cross-sectional area of the at least one nozzle in the outer main surface.

A technical effect of having the cross-sectional area of the at least one nozzle in the inner main surface larger that the cross-sectional area of the at least one nozzle in the outer main surface, may be that a pressure differential over the at least one nozzle can be relatively low. Hence, a desired flow rate through the at least one nozzle, and hence a desired production rate, may be reached at a relatively low pressure difference over the at least one nozzle. Consequently, the nozzle plate can be designed relatively thin and/or a number of nozzles in the nozzle plate can be relatively high. Hence, said production rate may be relatively high.

The inventors thus realized an inventive thought that adapting a shape of the at least one nozzle can be used for decreasing a pressure difference over the at least one nozzle needed for spraying the high-viscosity fluid and/or increasing a production rate of the at least one nozzle, with only a limited impact on strength of the nozzle plate and on a volume of a produced droplet. Further advantages and/or technical effects may include a stronger nozzle, a drop in necessary pressure, and/or the possibility for spray drying relatively higher viscosity fluids.

The high-viscosity fluid, or, in other words, viscous fluid, may have a shear viscosity larger than 0.1 pascal·second, preferably larger than 0.2 pascal·second, more preferably larger than 1 pascal·second. Said viscosity may be determined at a shear rate of 1 s$^{-1}$ and a temperature of 20 degrees Celsius, using a cone-plate rheometer.

Preferably, during pressurizing, the pressure difference over the at least one nozzle is kept at at most 15 bar, preferably at at most 12 bar. Conversely, WO2008/069639 relates to a method of spray drying of a high-viscosity fluid. According to WO2008/069639, a pressure drop over a nozzle in order to force the fluid out of the nozzle is larger than 15 bar. Then, a substantially mono-disperse stream of droplets may be generated from the fluid that flows out of the nozzle. By means of the at least one nozzle, a substantially mono-disperse stream of droplets may be generated from the fluid that flows out of the nozzle, even when the pressure difference over the at least one nozzle is kept at pressures below 15 bar, or even below 12 bar. It is to be appreciated, that a required pressure difference is lowered compared to the known spray drying method of WO2008/069639 through the currently disclosed nozzle design. Alternatively, higher viscosity fluids may be spray-dried using the same pressure, e.g. also at 15 bar or higher.

Preferably, the method comprises drying the fluid after it has passed the outer main surface. Preferably, the method comprises collecting the dried food product, thus obtaining the food product in the form of a powder.

According to a further aspect of the invention, there is provided an apparatus for spray-drying of a high-viscosity fluid that e.g. comprises a food product, the apparatus comprising: —a reservoir for containing the high-viscosity fluid; and —a nozzle plate that is in fluidum connection with the reservoir, has an inner main surface and an outer main surface, and is provided with at least one nozzle extending through the nozzle plate from the inner main surface to the outer main surface; and drying means for causing and/or allowing the droplets to dry to become particles; the apparatus being arranged for pressurizing the fluid in the reservoir so that, in use, the fluid flows towards the nozzle plate, thus creating a pressure difference over the at least one nozzle so that the fluid flows out of the at least one nozzle, thereby passing the outer main surface after passing the inner main surface, wherein a cross-sectional area of the at least one nozzle in the inner main surface exceeds a cross-sectional area of the at least one nozzle in the outer main surface.

Preferably, the apparatus comprises pressurizing means for pressurizing the fluid in the reservoir so that the fluid flows towards and/or is pressurized against the nozzle plate and out of the at least one nozzle, thereby passing the outer main surface after passing the inner main surface. Preferably, the pressurizing means are arranged for keeping a pressure difference over the at least one nozzle at at most 15 bar, preferably at at most 12 bar. Additionally, a lower pressure difference over the at least one nozzle, e.g. at most 15 bar or at most 12 bar, may result in a lower strain on the fluid and on relatively vulnerable parts of the apparatus.

Preferably, the apparatus is arranged for carrying out a method according to the invention.

In said aspect and said further aspect, preferably, an area ratio, being equal to the cross-sectional area of the at least one nozzle in the inner main surface divided by the cross-sectional area of the at least one nozzle in the outer main surface, is at least five and/or is at most fifty.

In said aspect and said further aspect, preferably, the at least one nozzle comprises a substantially non-widening, e.g. cylindrical, part that extends from the outer main surface, and comprises a substantially widening, e.g. tapered, optionally frustoconical, part that extends from the substantially non-widening part to the inner main surface. Optionally, the at least one nozzle is substantially trumpet-shaped.

In said aspect and said further aspect, preferably, in use a pressure difference ratio, being equal to a pressure difference over the substantially widening part divided by a pressure difference over the substantially non-widening part, is at most 1, preferably at most 0.5, more preferably at most 0.3, e.g. at most 0.2.

In said aspect and said further aspect, preferably, a length of the substantially non-widening part of the at least one nozzle, measured along an outflow direction of the high-viscosity fluid through said non-widening part, is at least equal to a diameter of the at least one nozzle, preferably at least three times a diameter of the at least one nozzle in the outer main surface. As a result, a relatively stable jet and/or droplet formation may be obtained by the fluid flowing out of the at least one nozzle 14. E.g. in an embodiment, the length of the substantially non-widening part is at least 60 micrometer, preferably 180 micrometer and/or at most 250 micrometer.

In said aspect and said further aspect, preferably, the at least one nozzle widens gradually from the outer main surface to the inner main surface.

In said aspect and said further aspect, preferably, a width, a length, and a thickness of the nozzle plate, a composition of the nozzle plate, as well as a size, a number, and a distribution of nozzles in the nozzle plate, are arranged for withstanding a pressure difference over the at least one nozzle of at least 12 bar, preferably at least 15 bar.

The invention also provides a food product that is produced by means of a method according to invention and/or an apparatus according to the invention.

Embodiments of the invention will now be described with reference to the accompanying drawings, in which corresponding reference symbols indicate corresponding parts, and in which:

FIG. 1 shows a schematic cross-section of an apparatus for spray-drying of a high-viscosity fluid, in a first embodiment according to the invention;

FIG. 2 schematically shows a cross section of a nozzle plate provided with at least one nozzle, in a second embodiment of an apparatus according to the invention;

FIG. 3 schematically shows a cross section of a nozzle plate provided with at least one nozzle, in a third embodiment of an apparatus according to the invention;

FIG. 4A schematically shows a front view of a nozzle plate provided with a plurality of nozzles, in a fourth embodiment of an apparatus according to the invention; and FIG. 4B schematically shows a front view of a nozzle plate provided with a plurality of nozzles, in a fifth embodiment of an apparatus according to the invention.

FIG. 6A shows a side view of another embodiment.

FIG. 6B illustrates a top view of FIG. 6A.

FIG. 7A shows a side view of another embodiment.

FIG. 7B illustrates a top view of FIG. 7A.

Figure 1:
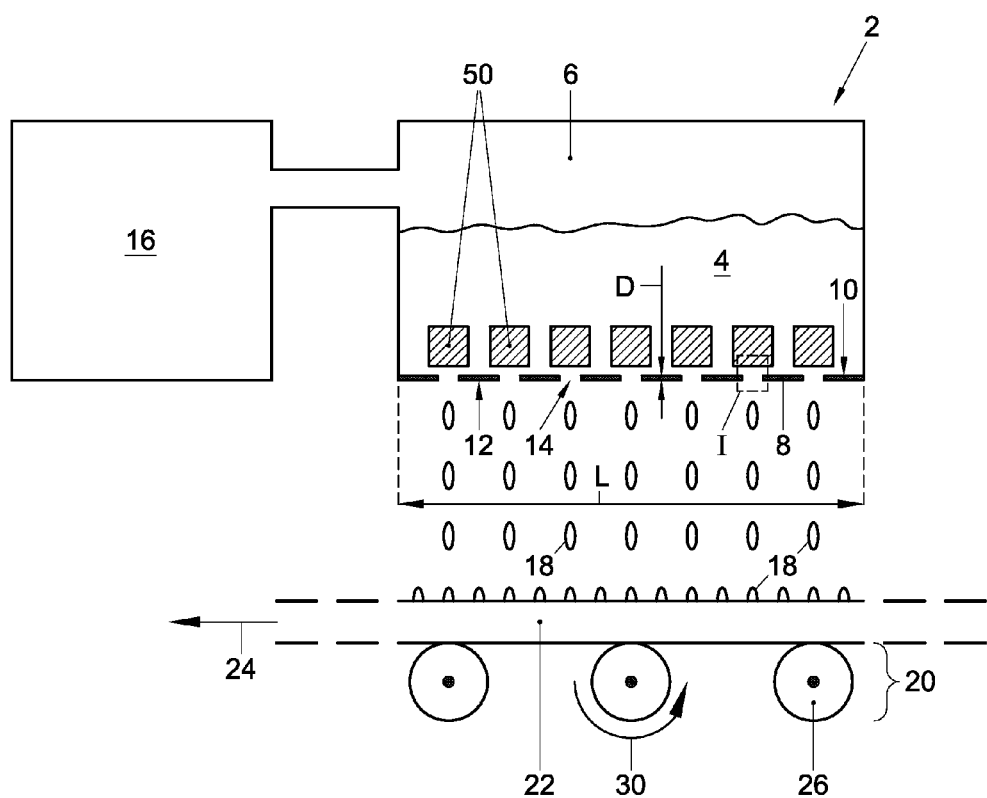

FIG. 1 shows a schematic cross-section of an apparatus 2 for spray-drying of a high-viscosity fluid 4, in a first embodiment according to the invention. The apparatus 2 may comprise a reservoir 6 for containing the high-viscosity fluid 4. The apparatus may further comprise a nozzle plate 8. The nozzle plate 8 may be in fluidum connection with the reservoir 6. The nozzle plate 8 may have an inner main surface 10 in contact and/or connection with the fluid 4 and an outer main surface 12. The nozzle plate may be provided with at least one nozzle 14, preferably a plurality of nozzles 14 that extend through the nozzle plate 8 from the inner main surface 10 to the outer main surface 12.

More in general, the term 'nozzle plate' may be interpreted broadly. The nozzle plate may be composed of a plurality of parts. Said parts may be mutually attached, thus forming a structure provided with nozzles. The term 'nozzle' may refer to an opening through the nozzle plate from which fluid may be ejected. A thickness D of the nozzle plate 8 may be measured in a direction perpendicular to the inner and/or outer main surface 10, 12. Said thickness D of the nozzle plate may be uniform, i.e. may vary at most 10 percent of a maximum thickness of the nozzle plate, apart from the nozzles. Alternatively, the thickness D of the nozzle plate may be non-uniform, i.e. may vary along the nozzle plate more than 10 percent of a maximum thickness of the nozzle plate. Hence, said structure may vary in a direction transverse to the nozzle plate, e.g. may be provided with recesses or cavities and/or projections, in addition to the nozzles. Optionally, a disc-shaped end part of a tube that forms a nozzle, or a plurality of said disc-shape end parts optionally spaced apart from each other, may be regarded as a nozzle plate. In other variations however, the term 'nozzle plate' may be interpreted more narrowly. Then, the nozzle plate may comprise a plate structure, preferably made out of one piece, provided with at least one nozzle. Said plate structure may have a length L and a width W (see e.g. FIG. 4A) being larger, e.g. at least five or at least ten times larger, than a maximum thickness of the plate structure. Said thickness D may be measured in a direction perpendicular to directions in which said length L respectively said width W of the plate structure are measured.

The apparatus 2 may be arranged for pressurizing the fluid in the reservoir 6. Thereto the apparatus 2 may comprise pressurizing means such as a pump 16 for pressurizing the fluid in the reservoir 6 and/or further pressure varying means

50 for varying a pressure near the nozzles in the nozzle plate for stimulating a controlled breakup of the ejected fluid jet. As a result of said pressurizing, in use, the fluid may flow towards the nozzle plate 8. Thus, said pressurizing may create a pressure difference over the at least one nozzle so that the fluid flows out of the at least one nozzle and thus is sprayed out of the at least one nozzle. Thereby, the fluid passes the outer main surface after passing the inner main surface. Hence, the fluid may flow out of the reservoir 6. Thus, a jet and/or droplets 18 may be formed from a nozzle 14.

Once ejected from the nozzle 14, the droplets 18 may be at least partially dried using a drying medium, such as air, to remove the liquid solvent such as water or other dissolving medium. The drying medium may be heated for accelerating an evaporation process of the liquid solvent. In this way the droplets may become particles and/or a powder of a dried food product. The drying medium may be provided e.g. by a drying means (not shown) such as a gas supply, heater, and/or fan for causing and/or allowing the droplets 18 to dry to become particles of the dried food product. Alternatively, the drying means may simply be provided by the air between the point of ejection from the nozzle and a destination position e.g. on a transporter 20.

The pressurizing means may generally comprise a pump 16 and/or a vibrating element 50 e.g. a piezo-electric element. By means of the pump 16, a base pressure may be generated. By means of the piezo-electric element 50, a variation on the base pressure may be generated. Such a variation may be used for controlling droplet formation from the fluid that flows out of the nozzle.

Advantageously, a cross-sectional area of the at least one nozzle in the inner main surface exceeds a cross-sectional area of the at least one nozzle in the outer main surface. Further details of embodiments and variations of the at least one nozzle are described with reference to FIGS. 2-4B.

Preferably, the pressurizing means are arranged for keeping a pressure difference over the at least one nozzle at at most 15 bar, preferably at at most 12 bar. Said pressure difference may be equal to a pressure in the reservoir adjacent to the at least one nozzle, e.g. in (a center of) the cross-sectional area of the at least one nozzle in the inner main surface, minus a pressure in an environment of the at least one nozzle, e.g. in (a center of) the cross-sectional area of the at least one nozzle in the outer main surface.

In a variation of the first embodiment, an apparatus 2 according to the invention may be provided with a transporter 20. The apparatus may further be provided in assembly with a substrate 22. The transporter 20 may be arranged for moving the substrate 20 with respect to the at least one nozzle, and/or vice versa. Thereto the transporter may be provided with rollers 26. Said movement of the substrate is indicated, as an example, with arrow 24. A possible rotation direction of the rollers 26 is indicated with arrow 30. The substrate may be positioned with respect to the at least one nozzle for receiving the jet and/or droplets. After drying the droplets, dried food product may be collected from the substrate 22. Thus, the food product may be obtained in dried form, e.g. in the form of a powder.

In another embodiment, the transporter may cause a further drying of the powder, e.g. when the droplets are only partially dried before landing on the transporter. For example the transporter may be provided with a heating means for further evaporating any remaining liquid in the droplets. Alternatively the transporter may comprise air blowers that blow the semi-dried droplets in the transport direction 24. In another example, the transporter may be formed by an air cushion with an upward flow to lift the particles and a sideways flow to move the particles in the transport direction 24. The air cushion may also be provided with heated air for further stimulating an evaporation of the liquid.

Figure 2:
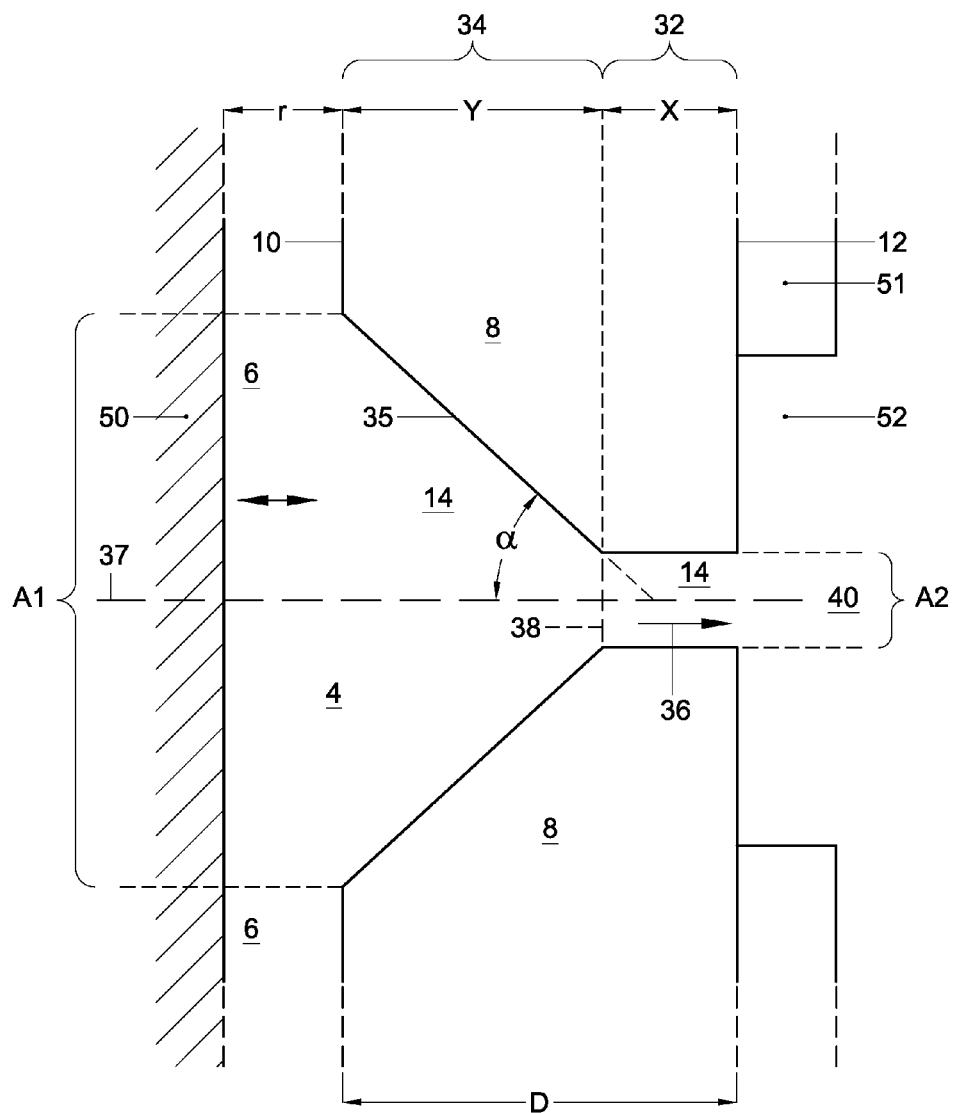

FIG. 2 schematically shows a cross section of a nozzle plate 8 provided with at least one nozzle 14, in a second embodiment of an apparatus 2 according to the invention. FIG. 2 also shows the reservoir 6. In a variation, the detail I indicated in FIG. 1 may correspond to the part of the nozzle plate 8 shown in FIG. 2 (rotated). However, nozzles 14 in the first embodiment of FIG. 1 may alternatively be shaped differently.

FIG. 2 shows the cross-sectional area $A_1$ of the at least one nozzle 14 in the inner main surface 10 (further also referred to as the first cross-sectional area $A_1$). FIG. 2 also shows a cross-sectional area $A_2$ of the at least one nozzle 14 in the outer main surface 12 (further also referred to as the second cross-sectional area $A_2$). The first cross-sectional area $A_1$, of the at least one nozzle in the inner main surface 10 exceeds the second cross-sectional area $A_2$, of the at least one nozzle 14 in the outer main surface 12.

The at least one nozzle 14 may comprises a substantially non-widening part 32. Said substantially non-widening part may be cylindrically shaped. The substantially non-widening part may extend from the outer main surface 12, in a direction towards the inner main surface 10, without reaching the inner main surface. The at least one nozzle further comprises a substantially widening part 34. Said substantially widening part 34 may be frustoconically shaped. The substantially widening part may extend from the substantially non-widening part to the inner main surface 10. By said extending the substantially widening part 34 may reach the inner may surface 10. In the substantially non-widening part, in an embodiment, a shear rate of the fluid may, in use, be typically in a range from $5 \cdot 10^5$ to $5 \cdot 10^{10}$ s$^{-1}$. Such shear rates may be reached when the pressure difference over the at least one nozzle 14 is kept at at most 12 bar.

In an embodiment, an angle $\alpha$ of the substantially widening part 34, e.g. frustoconically shaped, may be in a range from 30 to 60 degrees, e.g. approximately 45 degrees. Said angle $\alpha$ may be measured between a surface 35 of the substantially widening part 34, and an outflow direction 36 of the high-viscosity fluid through said substantially non-widening part 32 or an axis of symmetry 37 of the at least one nozzle.

In a typical embodiment, the nozzle geometry comprises a tapered and/or cylindrical channel in a thin plate, e.g. created using laser cutting technology in a 250 micrometer thick stainless steel plate. A cylindrical hole is provided with a diameter of 50 micrometers and a length X=80 micrometer. This is connected upstream (i.e. on the side of the inner main surface 10) to a tapered cone, i.e. frustoconical shape, with top angle of 90 degrees (i.e. $\alpha$=45 degrees) and diameter of 480 micrometer. This results in a cylindrical part of the channel with length of 50 micrometers and a conical part with length of Y=200 micrometers. In a single thin plate many of these channels may be placed in parallel, preferably more than 500. A typical cross-sectional area $A_1$ may e.g. be in the range 0.1-5 mm$^2$. while a typical cross-sectional area $A_2$ may be in the range 0.001-1 mm$^2$.

In an embodiment, the spray drying apparatus or method may comprise a pressure varying means 50. Advantageously, the pressure varying means 50, e.g. comprising a vibrating element, generates pressure waves or dynamic pressure variations in the fluid. The pressure waves may propagate through the nozzle and cause a controlled breakup of the fluid jet ejected from the nozzle 14. This controlled breakup is in contrast to a chaotic breakup process such as may be employed in an apparatus wherein droplet polydispersity is not important such as a high pressure spray cleaning apparatus.

The pressure varying means 50 may be controlled by a controller (not shown) arranged for controlling a frequency and/or amplitude of the pressure varying means in such a way that a controlled Rayleigh breakup of the ejected fluid jet occurs. A frequency may be chosen e.g. near a natural breakup frequency of the ejected fluid jet into droplets. In such a way a substantially mono-disperse jet of particles may be created, i.e. the size and/or volume of the particles is distributed over a relatively narrow range. Because the pressure in the fluid may be kept low, the pressure varying means 50 may positioned at a further distance from the nozzle than in a corresponding high pressure fluid where pressure variation may be more damped. The pressure varying means 50 may be positioned e.g. at a distance of r=2-1000 μm, e.g. around r=40 μm from the nozzle. Typical actuating frequencies of the pressure varying means may be in the range 500-200000 Hz, which frequency may correspond to a droplet ejection frequency from the nozzle. The pressure variation may in the range 1-15 bar. In an embodiment, the apparatus is characterized in that the pressure varying means comprises a movable pressure focusing member such as a control pin, which control pin can be moved in a longitudinal direction towards/away from the outflow opening of the nozzle 14, so that an end of the control pin can be placed at a predetermined distance, for instance in the distance interval of 2-1000 μm, from the outflow opening, for varying the pressure adjacent the outflow opening. In an embodiment a pressure focussing member is placed with an end at a predetermined distance, for instance in the distance interval of 2-1000 μm, from the outflow opening and the pressure focussing member and/or the nozzle plate are arranged for vibrating with respect to each other for varying the pressure adjacent the outflow opening. In use, the control pin vibrates with the desired actuating frequency for varying the pressure adjacent the outflow opening such as to effectuate a controlled Rayleigh breakup mechanism of the ejected fluid stream. The control pin is situated, for instance, in the fluid reservoir, the longitudinal direction being directed preferably substantially perpendicular to nozzle plate. The control of the control pin in the distance interval is preferably carried out with a relatively accurate pressure regulating mechanism, in view of the relatively small distances and for creating a desired Rayleigh breakup of the fluid. The precise frequency and distance interval in which the control pin is operatively regulated may depend on the viscosity of the fluid. Preferably an end of the control pin has a relatively small surface area of, for instance, 1-5 mm$^2$, preferably still larger than the surface area $A_1$. Accordingly, it is possible, with a relatively small driving force of up to, for instance, 30-150 N on the control pin, to effect a relatively large pressure variation of, for instance, 15 bar.

A suitable vibrating element 50 may comprise e.g. a piezoelectric, acoustic and/or electromagnetic actuating means, for actuating a vibrating element 50 near the nozzle 14. Alternatively or in conjunction, e.g. the nozzle plate 10 itself may be actuated by a vibrating element such as a piezo element. Alternatively or in conjunction, a back plate of the fluid reservoir in contact with the fluid may be actuated. A vibration actuator such as a piezo element may be limited to a specific operable range of pressures. In particular, this pressure may not be too high. Advantageously, the current nozzle design may allow for a lower pressure in the fluid reservoir thus providing a synergetic combination e.g. with a piezo vibrating element.

In an embodiment, the nozzle plate 8 can be a plate manufactured from thin metal foil, e.g. of a thickness of 0.25 mm. Advantageously, the nozzle plate 8 may further be provided with an optional supporting plate 51 which supports the nozzle plate 8, so that it does not collapse under a high pressure in the reservoir. The supporting plate 51 is provided with an opening 52 which is situated opposite the outflow opening 14. The diameter of the opening 52 can be e.g. an order of magnitude greater than the diameter of the outflow opening 14 so as not to disturb the out flowing fluid jet.

Figure 3:
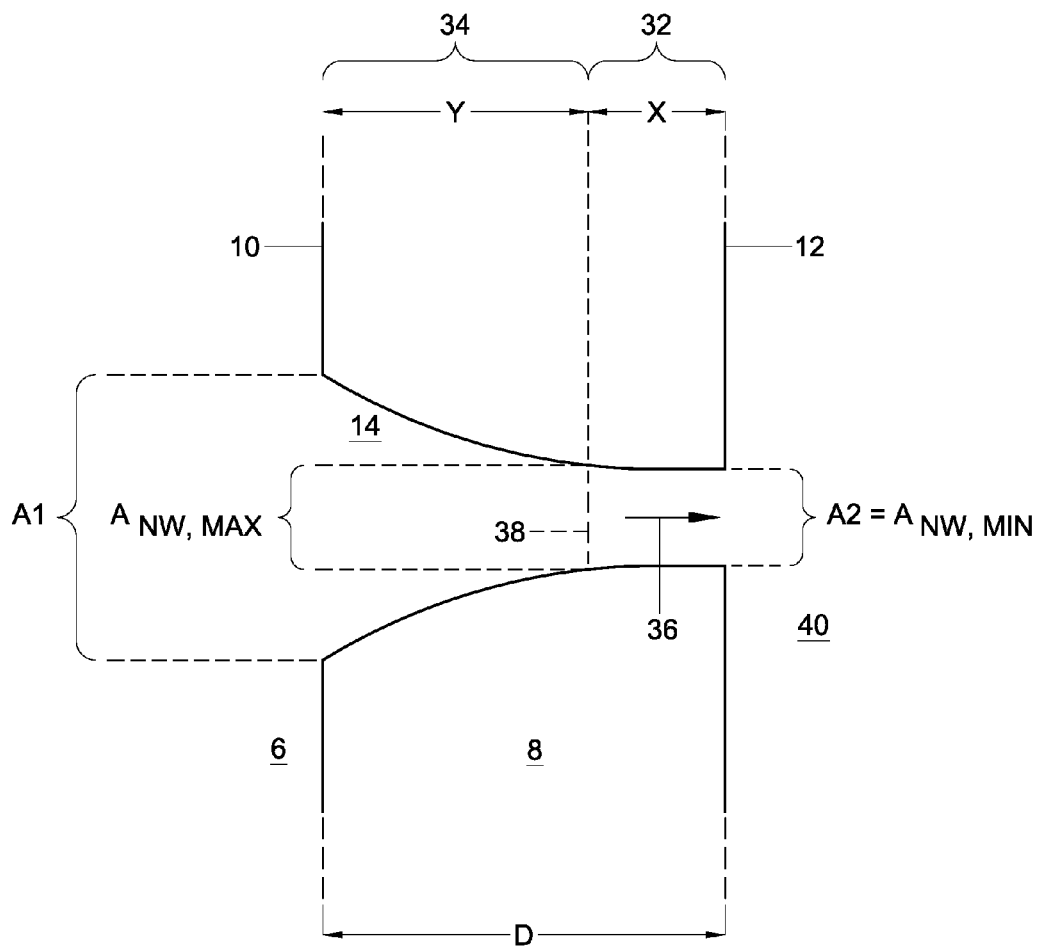

FIG. 3 schematically shows a cross section of a nozzle plate 8 provided with at least one nozzle 14, in a third embodiment of an apparatus 2 according to the invention. FIG. 3 shows the cross-sectional area $A_1$ of the at least one nozzle 14 in the inner main surface 10 (also referred to as the first cross-sectional area $A_1$). FIG. 3 also shows a cross-sectional area $A_2$ of the at least one nozzle 14 in the outer main surface 12 (also referred to as the second cross-sectional area $A_2$). FIG. 3 also shows part of the reservoir 6. It may be clear that a channel provided in the apparatus adjacent to and in fluidum connection with the at least one nozzle 14, may be regarded as forming at least part of the reservoir 6.

The at least one nozzle 14 may be substantially trumpet-shaped, as schematically indicated in FIG. 3. The at least one nozzle 14 may the substantially non-widening part 32 and the substantially widening part 34. The substantially non-widening part may be defined as a part of the at least one nozzle 14 wherein a cross-section area of the at least one nozzle is at most 1.2 times a minimum cross-section area of said part of the at least nozzle 14. Thus, in said substantially non-widening part, a maximum cross-sectional area $A_{nw,max}$ may be approximately equal to 1.2 times a minimum cross-sectional area $A_{nw,min}$, which in this case equals $A_2$. Said minimum cross-section area $A_{nw,min}$ may e.g. be equal to the second cross-sectional area $A_2$.

More in general, with respect to the nozzles 14 shown in FIGS. 2 and 3, and optionally with respect to other nozzles, at least the following six aspects may be appreciated.

Firstly, an area ratio, being equal to the first cross-sectional area $A_1$ of the at least one nozzle in the inner main surface 10 divided by the second cross-sectional area of the at least one nozzle $A_2$ in the outer main surface 12, is at least five, preferably at least ten, more preferably at least fifteen. As a result, an effective decrease of the pressure difference over the substantially widening part 34 may be obtained, in comparison to the pressure difference over the substantially non-widening part 32. Additionally or alternatively, the area ratio is at most fifty, preferably at most thirty, more preferably at most twenty. Such maxima for the area ratio may enable positioning nozzles relatively close together. Thus, a production rate may be increased.

Secondly, in an embodiment, a length X of the substantially non-widening part 32 of the at least one nozzle 14, measured along an outflow direction 36 of the high-viscosity fluid through said substantially non-widening part, may be at least equal to a diameter of the at least one nozzle, preferably at least three times the diameter of the at least one nozzle in the outer main surface 12. E.g. in an embodiment wherein the nozzle has diameter of 40 micron, the length of the substantially non-widening part is at least 40 micrometer, preferably at least 120 micrometer. As a result, a relatively stable jet and/or droplet formation may be obtained by the fluid flowing out of the at least one nozzle 14. Alternatively or additionally, said length X may be at most five times the nozzle diameter, preferably at most four times the nozzle diameter . . . . As a result, a pressure difference over the substantially non-widening part 32 may be limited. Thus, said length X may be in a range from 40 micrometer to 120 micrometer, preferably in a range from 40 micrometer to 100 micrometer or from 60 micrometer to 120 micrometer, more preferably in a range from 60 micrometer to 100 micrometer. Said length X may e.g. be approximately 50 micrometer or approximately 80 micrometer.

Thirdly, in an embodiment, a length Y of the substantially widening part 34 of the at least one nozzle 14, measured along the outflow direction 36 of the high-viscosity fluid through said substantially widening part, may be at least 100 micrometer, preferably at least 150 micrometer. Alternatively or additionally, said length Y may be at most 300 micrometer, preferably at most 250 micrometer. Said length Y may e.g. be approximately 200 micrometer.

Fourthly, a pressure difference ratio, being equal to a pressure difference over the substantially widening part divided by a pressure difference over the substantially non-widening part, is at most 1, preferably at most 0.5, more preferably at most 0.3, e.g. at most 0.2. Such pressure ratio's may be achieved by adapting a shape of the at least one nozzle and the area ratio. By choosing such pressure ratios, the thickness of the nozzle plate may be increased without decreasing the production rate too much. The pressure difference over the substantially non-widening part may be equal to a pressure at a (center of) a transition plane 38 between the substantially widening part and the substantially non-widening part, minus a pressure in an environment 40 of the at least one nozzle, e.g. in (a center of) the cross-sectional area of the at least one nozzle 14 in the outer main surface. The pressure difference over the substantially widening part may be equal to a pressure in the reservoir adjacent to the at least one nozzle, e.g. in (a center of) the cross-sectional area of the at least one nozzle 14 in the inner main surface, minus a pressure at (a center of) the transition plane 38 between the substantially widening part and the substantially non-widening part.

Fifthly, the at least one nozzle may widen gradually from the outer main surface to the inner main surface. Thus, a cross-sectional area of the at least one nozzle increases continually from the outer main surface towards the inner main surface.

Sixthly, the at least one nozzle 14 may be suitable for creating a substantially mono-disperse stream of droplets. This may be further aided e.g. by a vibrating element 50 such as discussed with FIG. 2. In such a substantially mono-disperse stream, generated droplets formed from the fluid that in use flows out of the at least one nozzle (i.e. is sprayed out of the at least one nozzle), have a size that is within 0.01 to 10 percent, preferably within 1 percent of a mean droplet volume of said generated droplets. Thus, an advantage over conventional spray nozzles may be reached. Using such conventional spray nozzles usually results in a poly-disperse spray of droplets. Is will be appreciated that, as a result of at least one nozzle shaped according to the invention, a substantially mono-disperse stream of droplets may be generated while the pressure difference over the at least one nozzle is kept at at most 12 bar. Generating a substantially mono-disperse stream of droplets usually costs less energy than generating a poly-disperse stream of droplets.

In general, a method of manufacturing the at least one nozzle in the nozzle plate may e.g. comprise laser cutting.

By means of laser cutting, the at least one nozzle may be cut in the nozzle plate. A thickness (see FIGS. 2 and 3) of the nozzle plate 8 D of the nozzle plate may e.g. be in a range from 200 micrometer to 300 micrometer, typically approximately 250 micrometer. Said nozzle plate may be substantially made of steel. For example, a method for producing the desired nozzle shape may involve the use electro sparking. An advantage of this method is that a nozzle shape may be precisely determined. Other materials besides steel may be copper, titanium, and molybdenum. An alternative method may employ etching techniques, e.g. in silicon. Alternatively still, laser light may be used to cut the nozzles either in metal or in a ceramic material, e.g. through laser ablation. Advantages of ceramic materials may be a longer lifetime and/or durability of the nozzles compared to metal.

Figure 4A:
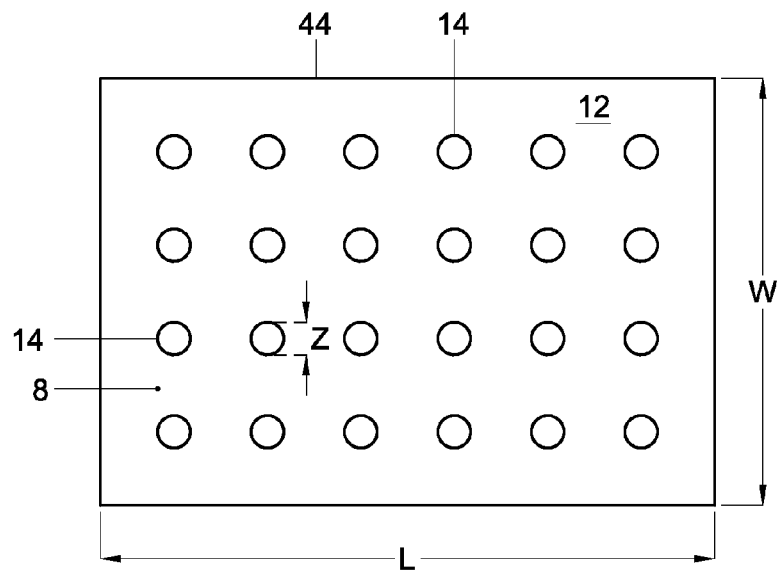

FIG. 4A schematically shows a front view of a nozzle plate 8 provided with a plurality of nozzles 14, in a fourth embodiment of an apparatus 2 according to the invention.

Figure 4B:
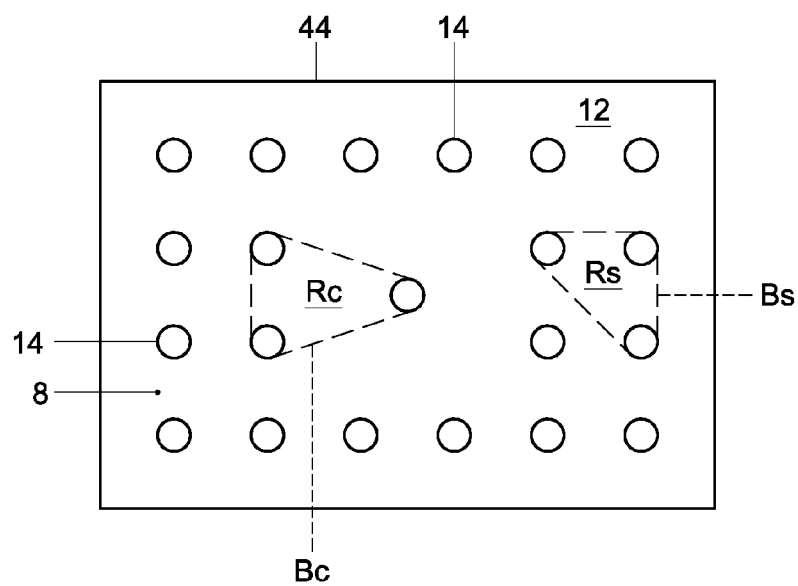
Figure 5A:
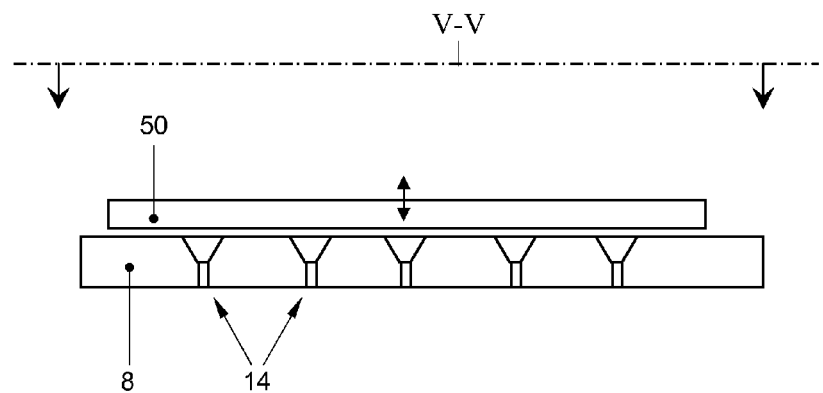
FIG. 5A shows a side view of an embodiment of a pressure varying means.
Figure 5B:
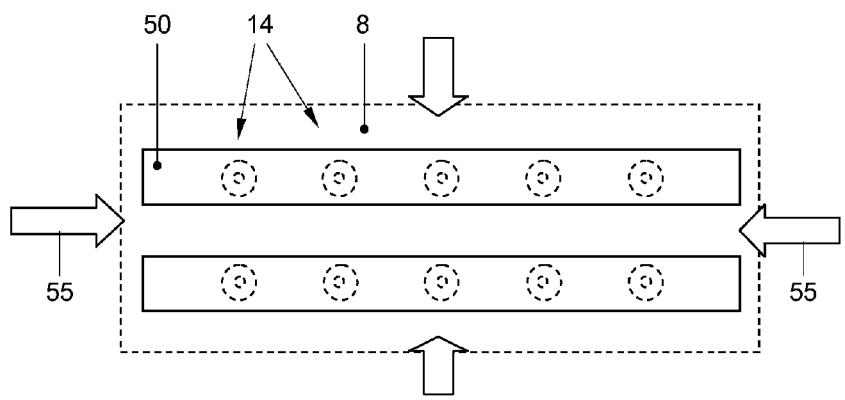
FIG. 5B shows a top view of FIG. 5A.

FIG. 4B schematically shows a front view of a nozzle plate 8 provided with a plurality of nozzles 14, in a fifth embodiment of an apparatus 2 according to the invention.

In the nozzle plates of FIGS. 4A and 4B, a width W, a length L, and the thickness D (see FIGS. 2 and 3) of the nozzle plate 8, a composition of the nozzle plate, as well as a size, a number, and a distribution of nozzles in the nozzle plate, may be arranged for withstanding a pressure difference over the at least one nozzle of at least 12 bar, preferably at least 15 bar. In an example, the width W of the nozzle plate is in a range from 5 to 25 mm and/or the length L of the nozzle plate is in a range from 5 to 250 mm. The nozzle plate 8 may have a substantially rectangular shape. However, other shapes are also possible. The thickness D of the nozzle plate may be in a range from 150 micrometer to 400 micrometer. The number of the nozzles in the nozzle plate may be larger than or equal to 500. A density of the nozzle in the nozzle plate may be such that a center to center distance of the nozzles is preferably higher than twice the nozzle diameter, preferably higher than three times the nozzle diameter. As a result, the jets ejected from the nozzles may be far enough apart not to interfere with each other. The nozzle plate may, e.g., be substantially made of steel or silicon. A size, for example a diameter Z, of the nozzles 14 may be in range from 10 micrometer to 200 micrometer, typically approximately 80 micrometer.

In an embodiment, the distribution of the nozzles in the nozzle plate may be uniform, i.e. the nozzle may be uniformly distributed over the nozzle plate. Such a uniform distribution is shown in FIG. 4A. Alternatively, the distribution of the nozzles in the nozzle plate may be non-uniform. E.g., a central region $R_c$ of the nozzle plate comprising least three nozzles and having a minimal boundary $B_c$, may be larger than a surrounding area $R_s$ that comprises the same numbers of nozzles as the central area $R_c$ and has a minimal boundary $B_s$. Thus, in a central region of the nozzle plate a density of the nozzles may be lower than in a surrounding region of the nozzle plate. Said surrounding region of the nozzle plate may be closer to an edge 44 of the nozzle plate 8 than a central region of the nozzle plate 8. It may be appreciated when the nozzle density in the central region is relatively low, as in this region a load on the nozzle plate may be relatively high. Thus, an optimum between productivity, e.g. number of nozzles in the nozzle plate or average nozzle density over the whole nozzle plate, and strength of the nozzle plate may be achieved.

An apparatus according to the invention, e.g. an apparatus in one of the embodiments and variations described above, may be used in a first embodiment of a method of spray-drying a high-viscosity fluid that comprises a food product, according to the invention (the first method). The first method may comprise providing a nozzle plate 8 wherein at least one nozzle 14 is provided, said nozzle plate having an inner main surface 10 and an outer main surface 12. The least one nozzle 14 may extend through the nozzle plate 8 from the inner main surface 10 to the outer main surface 12. The first method may further comprise providing the high-viscosity fluid in a reservoir 6 that is in fluidum connection with the at least one nozzle 14.

The first method may comprise pressurizing the high-viscosity fluid in the reservoir 6, e.g. by means of a pump. In an advantageous variation of the first method, during pressurizing, the pressure difference over the at least one nozzle is kept at at most 15 bar, preferably at at most 12 bar. As a result of said pressurizing, the fluid flows towards the nozzle plate, thus creating a pressure difference over the at least one nozzle so that the fluid flows out of the at least one nozzle. By such flow out of the at least one nozzle, the fluid passes the outer main surface after passing the inner main surface.

A cross-sectional area of the at least one nozzle in the inner main surface exceeds a cross-sectional area of the at least one nozzle in the outer main surface. Such is e.g. described with reference with FIGS. 2 and 3.

The first method may further comprise drying the fluid after it has passed the outer main surface. Thereto air may be guided towards a substrate on which the fluid may be sprayed. Additionally, the first method may comprise collecting the dried food product. Such may be achieved e.g. by scraping and/or blowing the dried food product from the substrate. Thus, the food product may be obtained in the form of a powder. Thus, a food product according to the invention may be obtained.

FIG. 5A shows a side view of an embodiment of a pressure varying means 50 that is arranged as a single (pressure) focusing member to pressurize a plurality of nozzles 14. Alternatively, the pressure varying means 50 may be arranged such that such as indicated in FIG. 1, wherein each focusing member is arranged to pressurize a single nozzle.

FIG. 5B shows a top view along the view direction V-V indicated in FIG. 5A. In the top view it is illustrated how the fluid to be sprayed through the nozzle 14 may be brought to a side of the nozzles 14 via a flow 55 that is provided in between the (elongated) pressure varying means 50 that pressurizes a row of nozzles 14. In an embodiment the pressure varying means are preferably wider on the ends to provide a more even flow to the nozzles 14.

FIG. 6A shows a side view of an embodiment of the nozzle 14 in a nozzle plate 8 wherein a cross-sectional area of the nozzle 14 in the inner main surface 10 of the nozzle plate 8 exceeds a cross-sectional area of the nozzle in the outer main surface 12 of the nozzle plate 8. The nozzle comprises a substantially widening part 34 and a substantially non-widening part 32.

FIG. 6B illustrates a top view of FIG. 6A along a viewing direction VI-VI. As is shown in this top view, the substantially widening part 34 in this embodiment of the nozzle is shaped like a cut-off four sided pyramid. An advantage for a pyramid shape with straight instead of round edges may be that it could be more easily manufacturable e.g. using etching techniques. Alternative to the shown four-sided pyramid, e.g. other pyramids or shapes may be possible, e.g. three sided pyramids, cone-shaped figures or combinations thereof.

FIG. 7A shows a side view of another embodiment of the nozzle 14 in a nozzle plate 8. FIG. 7B illustrates a top view of FIG. 7A along a viewing direction VII-VII. As is shown in these FIGS. 7A and 7B, the nozzle 14 of this embodiment comprises two substantially non-widening parts 32*a* and 32*b*, wherein the part 32*a* that is on an inner main surface 10 of the nozzle plate 8 has a larger diameter than the part 32*b* that is on an outer part of the nozzle plate 8. An advantage of the current embodiment of the nozzle 14 may be that it is more easily manufacturable than a nozzle with sloped sides. However, an advantage of a sloped side, e.g. in a widening part such as shown in FIG. 6A may be an advantageous pressure or force distribution across the nozzle 14 and or nozzle plate 8. Alternative to having two parts 32*a* and 32*b*, the nozzle 14 may comprise additional parts with intermediate diameters between those of 32*a* and 32*b*, e.g. the nozzle may comprise three steps of non-widening parts with different diameter. An advantage may be an improved tunability of the pressure drop across the nozzle 14 versus a strength of the nozzle plate 8 to withstand pressure differences. Alternatively, a combination of several widening and/or non-widening parts with different diameters and/or slopes may be possible.

Without being bound by theory, a technical effect of the present nozzle design may be understood as follows. The flow rate through a nozzle of a fluid of certain viscosity for a given pressure differential over the nozzle is related to a flow resistance of the nozzle which in turn correlates with the length and cross-section of the nozzle. In general, a long and/or narrow nozzle may have a higher flow resistance than a short and/or wide nozzle. To achieve a higher flow rate at the same pressure differential or the same flow rate at a lower pressure differential, the nozzle may thus be shortened and/or widened. However, a shorter nozzle generally corresponds to a thinner nozzle plate, meaning that the plate can handle lower pressures which may in turn correspond to a lower flow rate. On the other hand a wider nozzle may result in undesired characteristics with respect to the jet flowing from the wider nozzle, e.g. a larger particle size.

In an aspect of the present nozzle design, the above identified problem is remedied at least partially by maintaining an output cross-section of the nozzle for maintaining a desired jet characteristic and widening the input cross-section thereby decreasing an overall flow resistance of the nozzle compared to a straight nozzle having equal input and output cross-sections. This in turn may result in increasing a flow rate of fluid through the nozzle for a given pressure differential and viscosity; and/or lowering a required pressure differential for a given viscosity and desired flow rate of the fluid; and/or an ability to spray-dry higher viscosity fluids for a given flow rate and pressure differential. Other effects may include a stronger nozzle plate compared to a (thinner) nozzle plate having straight nozzles of equal flow resistance. It is thus to be appreciated that, for a given cross-sectional area of the at least one nozzle in the outer main surface, the exceeding cross-sectional area of the at least one nozzle in the inner main surface positively correlates with a flow rate through the at least one nozzle and/or negatively correlates to a required pressure differential over the at least one nozzle and/or positively correlates with a viscosity of a fluid that can be spray dried through the at least one nozzle. In other words, when the cross-sectional area of the inner main surface is increased with respect to the cross-sectional area of the outer main surface, the flow rate through the nozzle may increase and/or the required pressure differential over the nozzle may decrease and/or the viscosity of the fluid that can be spray dried may increase compared to a straight nozzle, i.e. a nozzle having the same cross-sectional area at the inner and outer main surface. Increasing the flow rate may yield an increased production rate of the material to be spray dried. The production rate may also be increased by increasing a density of the material to be spray dried in the fluid, which may correspond to an increased viscosity of the fluid.

The various elements of the embodiments as discussed and shown offer certain advantages e.g. for spray drying food products. Of course, it is to be appreciated that any one of the above embodiments or processes may be combined with one or more other embodiments or processes to provide even further improvements in finding and matching designs and advantages. Embodiments of the invention are not limited to the foregoing description and drawings. For example, suitable products that may be spray dried with the currently proposed nozzle include high viscosity fluids e.g. comprising food products, pharmaceutical products, fertilizer/manure products, etc. Furthermore, the teachings of the invention may find further application in other high-viscosity fluid spraying applications.

The description of the exemplary embodiments is intended to be read in connection with the accompanying drawings, which are to be considered part of the entire written description. In the description, relative terms as well as derivative thereof should be construed to refer to the orientation as then described or as shown in the drawing under discussion. These relative terms are for convenience of description and do not require that the apparatus be constructed or operated in a particular orientation unless expressly indicated or obvious from general considerations. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. It is noted that also any kinematic inversions having similar functionality as described in the embodiments are considered as part of the disclosure.

The use of expressions like: "preferably", "in particular", "especially", "typically" etc. may relate to optional features. The term "comprising" does not exclude other elements or steps. The indefinite article "a" or "an" does not exclude a plurality. Features which are not specifically or explicitly described or claimed may be additionally comprised in the structure according to the present invention without deviating from its scope. Any of the disclosed devices or portions thereof may be combined together or separated into further portions unless specifically stated otherwise. Several "means" may be represented by the same or different item(s) or implemented structure or function. No specific sequence of acts or steps is intended to be required unless specifically indicated; and no specific ordering of elements is intended to be required unless specifically indicated.

The invention claimed is:

1. Method of spray-drying a high-viscosity fluid using a spraying device, the method comprising:
   providing a nozzle plate wherein at least one nozzle is provided, said nozzle plate having an inner main surface and an outer main surface, the at least one nozzle extending through the nozzle plate from the inner main surface to the outer main surface;
   providing the high-viscosity fluid in a reservoir that is in fluidum connection with the at least one nozzle;
   pressurizing the high-viscosity fluid in the reservoir, wherein the fluid flows, as a result of said pressurizing, towards the nozzle plate, thus creating a pressure difference over the at least one nozzle so that the fluid flows out of the at least one nozzle, thereby passing the outer main surface after passing the inner main surface; wherein the fluid flowing out of the nozzle forms a jet that breaks up into droplets; and
   at least partially drying the droplets in a drying medium, to become particles;
   wherein a cross-sectional area of the at least one nozzle in the inner main surface exceeds a cross-sectional area of the at least one nozzle in the outer main surface thereby decreasing a pressure difference over the at least one nozzle needed for spraying the high-viscosity fluid, and
   wherein an area ratio, being equal to the cross-sectional area of the at least one nozzle in the inner main surface divided by the cross-sectional area of the at least one nozzle in the outer main surface, is at least five.

2. Method according to claim 1, wherein the area ratio is at most fifty.

3. Method according to claim 1, wherein the at least one nozzle comprises a substantially non-widening part that extends from the outer main surface, and comprises a substantially widening part that extends from the substantially non-widening part to the inner main surface.

4. The method of claim 3, wherein the substantially non-widening part is cylindrical and the substantially widening part is frustoconical.

5. Method according to claim 3, wherein a pressure difference ratio, being equal to a pressure difference over the substantially widening part divided by a pressure difference over the substantially non-widening part, is at most 1.

6. The method of claim 5, wherein the pressure difference ratio is at most 0.5.

7. Method according to claim 1, wherein, during pressurizing, the pressure difference over the at least one nozzle is kept at at most 15 bar.

8. The method of claim 7, wherein the pressure difference over the at least one nozzle is kept at at most 12 bar.

9. Method according to claim 1, further comprising the step of generating dynamic pressure variations in the fluid near the nozzle that propagate through the nozzle and cause a controlled breakup of the fluid jet flowing out of the nozzle, the broken up fluid jet forming substantially monodisperse droplets.

10. The method of claim 1, wherein the drying medium is air.

11. Apparatus for spray-drying of a high-viscosity fluid, the apparatus comprising:
    a reservoir for containing the high-viscosity fluid;
    a nozzle plate that is in fluidum connection with the reservoir, has an inner main surface and an outer main surface, and is provided with at least one nozzle extending through the nozzle plate from the inner main surface to the outer main surface; and
    drying means;
    the apparatus being arranged for pressurizing the fluid in the reservoir so that, in use, the fluid flows towards the nozzle plate, thus creating a pressure difference over the at least one nozzle so that the fluid flows out of the at least one nozzle, thereby passing the outer main surface after passing the inner main surface; wherein the fluid flowing out of the nozzle forms a jet that breaks up into droplets; wherein the drying means is arranged for causing and/or allowing the droplets to dry to become particles
    wherein a cross-sectional area of the at least one nozzle in the inner main surface exceeds a cross-sectional area of the at least one nozzle in the outer main surface thereby decreasing a pressure difference over the at least one nozzle needed for spraying the high-viscosity fluid, and wherein an area ratio, being equal to the cross-sectional area of the at least one nozzle in the inner main surface divided by the cross-sectional area of the at least one nozzle in the outer main surface, is at least five.

12. Apparatus according to claim 11, wherein the area ratio is at most fifty.

13. Apparatus according to claim 12, wherein the at least one nozzle comprises a substantially non-widening part that extends from the outer main surface, and comprises a substantially widening part that extends from the substantially non-widening part to the inner main surface.

14. The apparatus of claim 13, wherein the substantially non-widening part is cylindrical and the substantially widening part is frustoconical.

15. Apparatus according to claim 12, wherein a length of the substantially non-widening part of the at least one nozzle, measured along an outflow direction of the high-viscosity fluid through said non-widening part, is at least equal to three times a diameter of the at least one nozzle in the outer main surface.

16. Apparatus according to claim 11, comprising pressurizing means for pressurizing the fluid in the reservoir so that the fluid flows towards the nozzle plate and out of the at least one nozzle, thereby passing the outer main surface after passing the inner main surface.

17. Apparatus according to claim 16, wherein the pressurizing means are arranged for keeping a pressure difference over the at least one nozzle at at most 15 bar.

18. The apparatus of claim 17, wherein the pressure difference over the at least one nozzle is kept at at most 12 bar.

19. Apparatus according to claim 11, further comprising a pressure varying means in the fluid near the nozzle, the pressure varying means arranged for generating dynamic pressure variations in the fluid near the nozzle that propagate through the nozzle and cause a controlled breakup of the fluid jet flowing out of the nozzle, the broken up fluid jet forming substantially mono-disperse droplets.

20. Apparatus according to claim 11, wherein the pressure varying means comprises a pressure focusing member arranged such that an end of the pressure focusing member facing the nozzle is placed at a distance of 2-1000 µm from the outflow opening and wherein the pressure focusing member and/or the nozzle plate are arranged for vibrating with respect to each other for varying the pressure adjacent the outflow opening.

* * * * *